United States Patent [19]

Knute

[11] 3,905,232

[45] Sept. 16, 1975

[54] ELECTRONIC THERMOMETER

[75] Inventor: Wallace L. Knute, San Diego, Calif.

[73] Assignee: IVAC Corporation, La Jolla, Calif.

[22] Filed: Oct. 5, 1973

[21] Appl. No.: 403,898

[52] U.S. Cl. .......................................... 73/362 AR
[51] Int. Cl.² ...................... G01K 1/08; G01K 7/16
[58] Field of Search ................................ 73/362 AR

[56] References Cited
UNITED STATES PATENTS

| | | |
|---|---|---|
| 2,753,714 | 7/1956 | Perkins et al. ................. 73/362 AR |
| 3,500,280 | 3/1970 | Ensign ......................... 73/362 AR X |
| 3,530,718 | 9/1970 | Ehlo ............................. 73/362 AR |
| 3,738,479 | 6/1973 | Sato ............................ 73/362 AR X |

*Primary Examiner*—Richard C. Queisser
*Assistant Examiner*—Frederick Shoon
*Attorney, Agent, or Firm*—Fulwider, Patton, Rieber, Lee & Utecht

[57] ABSTRACT

Apparatus for automatically actuating and deactuating the electrical circuitry of an electronic thermometer of the type which uses a temperature sensing probe and disposable probe covers in the measurement of body temperature. The probe projects fowardly from a thermometer housing and a tubular probe cover is installed by driving the probe rearwardly into the housing, against resilient means, until a retaining means on the housing engages the cover. The probe is rigidly attached to a probe ejection shaft extending through the housing and movable with the probe to a rearward position during installation of the probe cover and to a forward position to eject the cover. The ejection shaft has a camming surface which cooperates with an actuator arm of a thermometer power supply microswitch located within the housing, to cam the microswitch "on" as the probe cover is installed, and "off" as the probe cover is ejected by manually pushing the ejection shaft forward.

12 Claims, 7 Drawing Figures

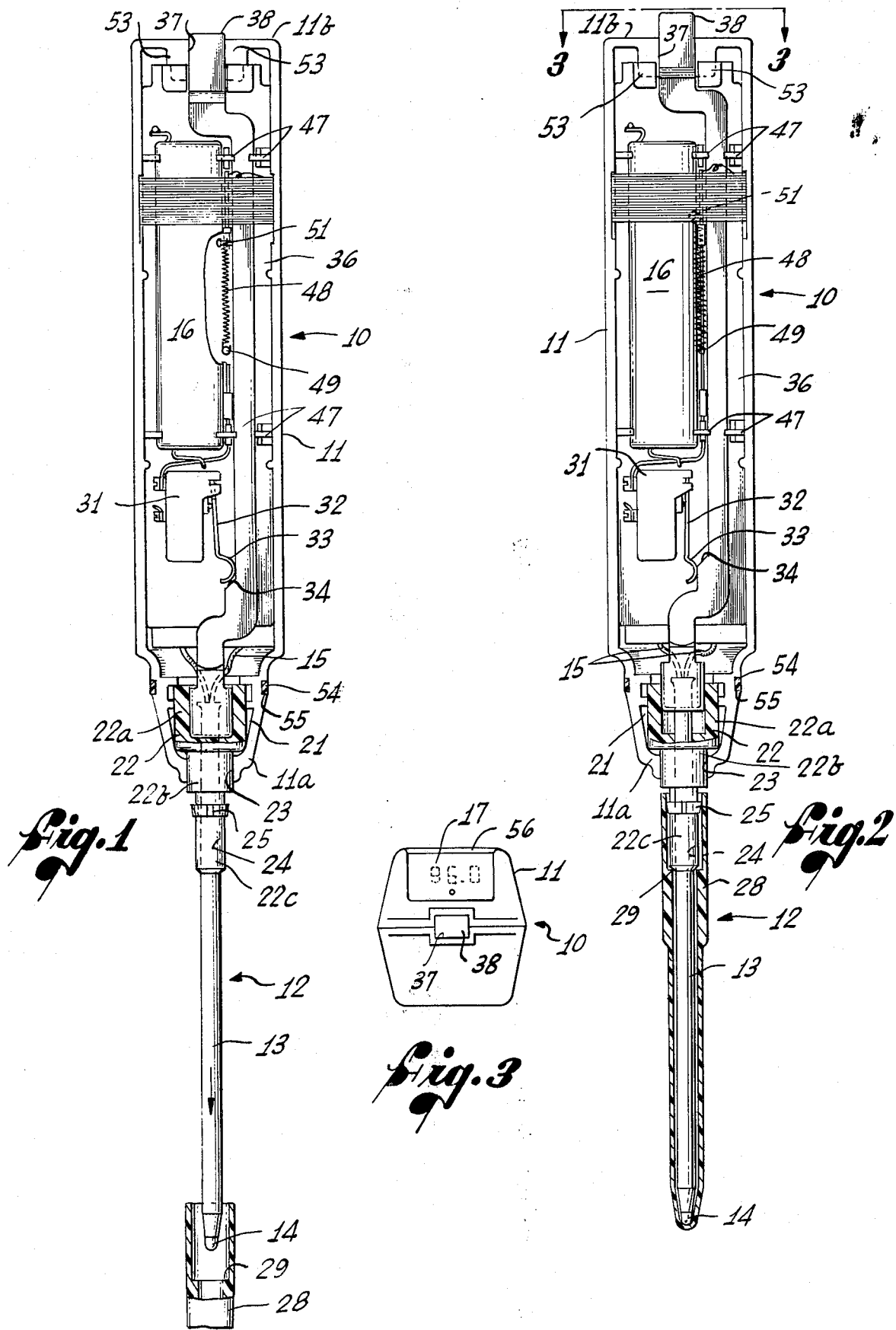

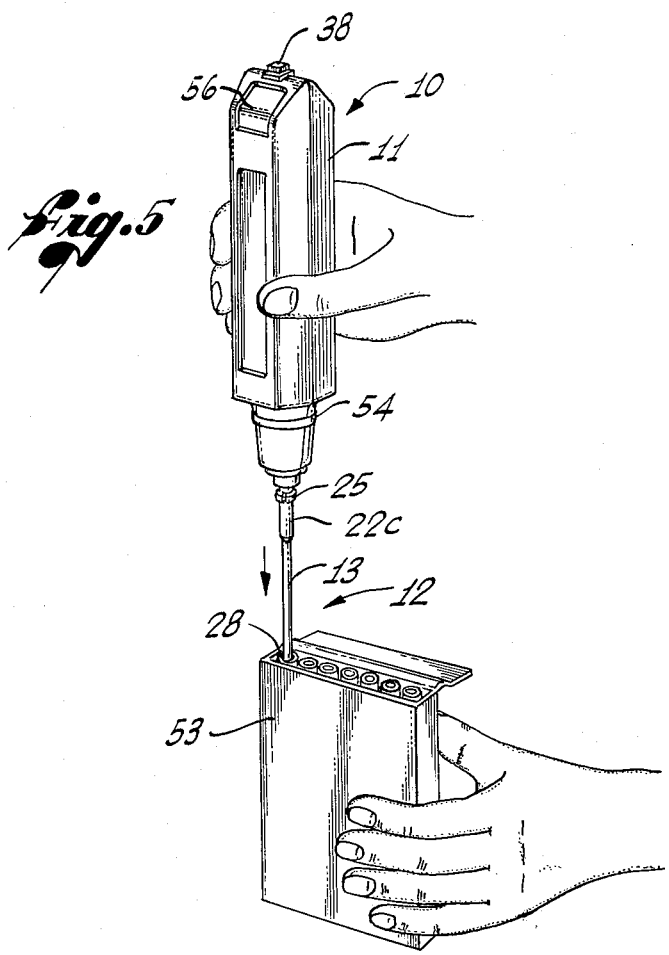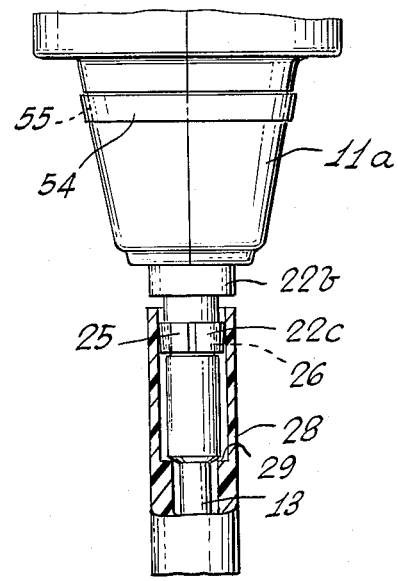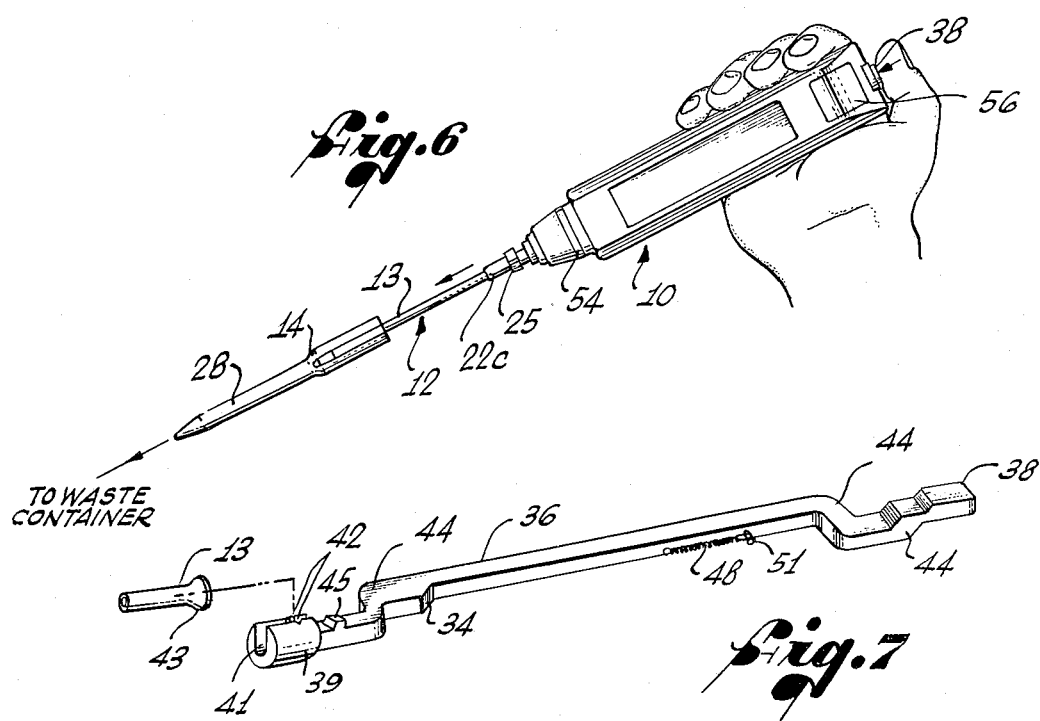

ELECTRONIC THERMOMETER

BACKGROUND OF THE INVENTION

This invention relates generally to improvements in electronic thermometers, and, more particularly, to improvements in electronic thermometers adapted to use disposable probe covers. Typical examples of such probe covers are described in U.S. Pat. No. 3,738,479, entitled "Disposable Rigid Thermometer Probe Cover," issued June 12, 1973, inventor Stephens N. Sato.

Before the development of reliable and accurate electronic thermometers, it was common practice in hospitals and doctors' offices to measure the body temperature of a patient by means of a glass bulb thermometer incorporating a mercury column which expands and contracts adjacent a calibrated temperature scale. The glass bulb containing the bulk of the mercury is inserted into the patient's mouth or rectum, and removed after several minutes to read the temperature. The disadvantages of this means of temperature measurement are well known. Glass thermometers are easily breakable, have to be retained in the patient for a relatively long period, and, more importantly, require costly and time consuming sterilization and redistribution before they can be reused.

The introduction of accurate and reliable electronic thermometers, using a temperature sensing probe with a disposable probe cover of the type described in the aforementioned U.S. Pat. No. 3,738,479, overcame most of these disadvantages. The disposable probe covers are typically hygienically packaged in boxes and are not handled by personnel at any time prior to, during, or after installation on the probe.

The probe typically comprises a temperature sensor on the tip of a rigid probe shaft, and the probe cover in its installed position forms a substantially rigid sleeve over the probe and is held in position by a retaining means which automatically secures the cover in place as it is installed. Each cover has a tip which is formed, either by virtue of choice of material, wall thickness, or both, as a good heat conductor, and, during use, the temperature sensing probe is resiliently urged into good physical contact with the tip, to enable thermal transfer through the cover tip to probe. After use, the probe cover is ejected from the probe and replaced with another cover just before the next use.

Electronic thermometers of modern design typically display the measured temperature in digital form by means of light-emitting diodes or similar display devices. Although the power consumption of electronic devices may usually be kept quite low by using solid-state circuitry, the power consumption of even small display devices is relatively large. Consequently, if electronic thermometers are to have the convenience of a self-contained power source, it is of prime importance that the power consumption be kept to a minimum to avoid the cost and inconvenience of frequently replacing or recharging the power source. In electronic thermometers available heretofore, power savings could be effected only by manually switching the thermometer off when it was not in use. In many instances, however, several patients may have to have their temperature measured at about the same time, and personnel will often leave the thermometer switched on between such closely spaced uses. This, in turn, results in an unnecessary and wasteful consumption of power, with the consequent need for much more frequent recharging than would be necessary if power drain were confined only to intervals of actual temperature measurement. In addition, such power drain limits the number of temperatures that can be taken between successive rechargings of the power source.

Thus, since the development of portable electronic thermometers, there has been a considerable need for a thermometer which is automatically switched off when not in use and automatically switched on again when prepared for subsequent use. The present invention satisfies this need.

SUMMARY OF THE INVENTION

The present invention resides in automatic actuation and deactuation means for an electronic thermometer. Basically, and in general terms, it includes a switch for switching the thermometer on or off, means for moving the switch to an "on" position in response to the installation of a probe cover, means for ejecting the probe cover after use and, by the same action, returning the switch to an "off" position. Thus, the thermometer will be readied electrically practically simultaneously with its being readied mechanically by the installation of a probe cover, and it will be deactivated electrically practically simultaneously with its mechanical deactivation by ejection of the probe cover.

More specifically, in a presently preferred embodiment of the invention, the means for ejecting the probe cover after use includes a manually operated button connected to the temperature sensing probe by a rigid shaft. The probe cover is held in its installed position by retaining means, and resilient means urge the probe tip into heat conducting contact with the probe cover. Movement of the button in a forward direction, toward the probe tip, is transmitted through the shaft to the probe and, in turn, to the probe cover, to override and free the cover from the retaining means by which it is held in the installed position. The shaft includes a camming surface which, during this cover ejection movement, cams an actuator arm of the switch into an "off" position. When a new probe cover is installed, the probe, and with it the shaft and ejection button, must be pushed back to their original position before the probe cover can engage the retaining means. Consequently, as the probe cover is installed, the camming surface on the shaft cams the switch actuator to the "on" position again.

A presently preferred embodiment of the invention is particularly adapted for use in an electronic thermometer manufactured as a single-piece unit. Electronic and display components of the thermometer are enclosed in a housing having a front end through which the probe projects and a rear end through which the ejection button projects. The ejection button and shaft are formed as a single piece, and the shaft extends through the housing and is adapted at its front end for rigid coupling to the probe. A collar secured to the housing surrounds the probe at the front end of the housing and extends, as a sleeve in concentric sliding engagement, along a portion of the probe. This collar abuts a shoulder inside the probe cover to limit rearward movement of the cover toward the housing, and includes a resilient retraining ring mounted on the collar to retain the installed cover on the collar, and hence on the thermometer.

The ejection button, shaft and probe can move together with respect to the housing and, as mentioned earlier, when the probe cover is installed, resilient means are used to urge the probe tip into contact with the probe cover. The biasing forces of the resilient means are not so strong, however, as to overcome the cover retraining means. When no cover is installed, the resilient means maintain the probe in a forwardly projected position, and installation of a cover requires movement of the probe, shaft and ejection button to a rearwardly retracted position at which the cover retaining means can be engaged.

The thermometer switch is also enclosed in the housing and is appropriately located to enable camming of the switch actuator to the "on" position when the shaft is in the rearward position, and to the "off" position when the shaft is in the forward position.

It will be appreciated from the foregoing that the present invention constitutes a significant advance in the field of portable electronic thermometers. In particular, the provision of means for actuating and deactuating the thermometer electrically and mechanically in one action at practically the same time, results in substantial economics of power consumption, and improves the overall efficiency of the thermometer by increasing the time between replacement or recharging of its power supply. Hence, it will be apparent that a greater number of temperatures can be taken before such recharging or replacement is necessary. Other aspects and advantages of the invention will become apparent from the following more detailed description taken in conjunction with the accompanying drawings.

BRIEF DESCRIPTION OF THE DRAWINGS

FIG. 1 is a plan view, partly in section and with one half of the housing removed, of a presently preferred embodiment of an electronic thermometer incorporating the invention, the thermometer being shown with the probe cover removed;

FIG. 2 is a view similar to FIG. 1, but shown with the probe cover installed;

FIG. 3 is an end view of the thermometer taken substantially along the line 3—3 of FIG. 2;

FIG. 4 is an enlarged, partial plan view, with portions shown in section, illustrating the means for retaining the probe cover in an installed position on the thermometer;

FIG. 5 is a perspective view illustrating the manner in which a probe cover is installed on the thermometer;

FIG. 6 is a perspective view of the thermometer, showing ejection of a probe cover; and FIG. 7 is a perspective view of the ejection button and shaft used in the thermometer construction of FIGS. 1 and 2.

DETAILED DESCRIPTION

As shown in the drawings for purposes of illustration, a presently preferred embodiment of the invention is particularly adapted for use in an electronic thermometer, indicated generally by the numeral 10, of the type that is constructed as a single, self-contained, portable unit. As best viewed in FIGS. 1 and 2, the thermometer 10 is enclosed in a housing 11 having a front end 11a from which a temperature sensing probe 12 projects forwardly. The probe 12 has a rigid shaft 13, and a temperature sensitive transducer (not shown) mounted at its forward tip 14, the transducer being connected by electrical conductors 15 to appropriate electronic temperature measuring circuitry 16 within the housing 11. The thermometer 10 indicates the temperature reading by means of a conventional digital display device 17 (FIG. 3), which may include light-emitting diodes or similar components.

The electronic temperature measuring apparatus 16 may be of any suitable design. For example, it may be functionally equivalent to the apparatus disclosed in U.S. Pat. No. 3,702,076, entitled "Electronic Thermometer," issued Nov. 7, 1972, inventor Heinz W. Georgi.

The front end 11a of the thermometer housing 11 is tapered to define a generally conical cavity 21 sized to receive and securely retain a collar 22. The collar 22 has a first generally cylindrical portion 22a by which it is retained in the cavity 21, a second cylindrical portion 22b, having reduced inside diameter and a reduced outside diameter sized to fit within a cylindrical passageway 23 through the front end 11a of the housing 11, and further includes a coaxial cylindrical sleeve 22c of further reduced outside diameter, extending forwardly and concentrically over a portion of the probe shaft 13. The collar 22 has an axial, cylindrical passageway 24 therethrough surrounding the probe shaft 13 and in sliding engagement with the shaft.

As best shown in FIG. 4, the collar 22 has a canted, resilient split ring 25 seated within a circumferential groove 26 on the sleeve 22c. A rigid, tubular, disposable probe cover 28 is shaped to fit over both the probe 12 and the sleeve 22c so that the resilient split ring 25 engages the cover's inner surface and retains it on the probe with the sleeve 22c abutting an inner shoulder 29 defined in the probe cover as a limit stop.

It will be apparent from the foregoing description that the illustrative electronic thermometer 10 is mechanically readied for use by inserting the probe 12 into a probe cover 28 until the sleeve 22c abuts the shoulder 29 and the resilient split ring 25 engages the inside surface of the cover to retain it in the installed position. The probe cover 28 can be ejected from the probe 12 by applying a force along the axis of the probe, to forwardly project the probe shaft so that the probe tip 14 pushes the probe cover forward to overcome the frictional force between the split ring 25 and the cover.

To completely ready the thermometer 10 for use requires, of course, the energization of the electronic circuitry 16 as well as the installation of a probe cover 28. When a manually operable, separate electrical switch is provided, it is often left switched on between closely spaced uses of the thermometer, resulting in excessive power consumption and necessitating frequent replacement or recharging of the power source employed. Moreover, such power drain reduces the number of temperatures that can be taken with the thermometer between recharging cycles.

In accordance with the present invention, the thermometer 10 is energized electrically in substantially the same action as the installation of a probe cover 28, and is de-energized electrically in substantially the same action as the ejection of the probe cover i.e., there is practically concurrent arming of the mechanical and electrical systems of the thermometer.

In the illustrative embodiment, power is supplied to the electronic circuitry 16 through a microswitch 31 having a spring-loaded actuator arm 32 with an arcuate end portion 33. The switch is located in the housing 11 so that a camming surface 34 rigidly coupled to the probe 12 selectively engages the end portion 33 of the actuator arm 32 and cams the arm between an "off" position and an "on" position as the probe is moved between a forwardly projecting position and a rearwardly retracted position.

More specifically, the camming surface 34 is formed on an ejection shaft 36 extending through the housing 11 from the front end 11a to the rearward end 11b, where it extends through a rectangular opening 37 to form an ejection button 38. At its forward end, the ejection shaft 36 terminates in a generally cylindrical boss 39 (see FIG. 7) having a deep slot 41 extending longitudinally for the length of the boss. The slot 41 is sized to receive the probe shaft 13, and has a pair of parallel grooves 42 in its opposite walls, to receive a flange 43 formed at the rearward end of the probe shaft 13, and to thereby restrain the probe shaft from axial movement in the boss 39 relative to the ejection shaft 36. Thus, the probe shaft 13 is rigidly coupled to the ejection shaft 36 so that the pair of shafts can move as a single unit parallel to the longitudinal axis of the thermometer 10.

The ejection shaft 36 is molded as a single piece of rigid plastic material, and, as shown in FIG. 7, includes a number of bends or offsets 44 so that a substantial portion of the shaft 36 can be located close to the inside walls of the housing 11 for economy of space. The camming surface 34 is defined by a transition from a smaller to a larger cross-section toward the forward end of the shaft 36. As the probe 12 and ejection shaft 36 are moved to the rearward position to install a probe cover 28, the end section 33 of the switch actuator arm 32 is cammed away from the shaft 36 to close the microswitch 31. A limit stop on the shaft 36 in the form of a rearwardly facing abutment 45 limits rearward movement of the shaft should it be moved rearwardly by other than the installation of a probe cover 28. In normal use, rearward movement of the shaft 36 is limited by the abutment of the sleeve 22c against the internal shoulder 29 of the probe cover 28 (FIG. 4).

The slotted boss 39 on the forward end of the ejection shaft 36 is sized to fit slidingly in the first, and larger, cylindrical portion 22a of the collar 22, with the probe shaft 13 extending forwardly through the central passageway 24 in the second cylindrical portion 22b and the sleeve 22c. Thus, when the probe 12 is moved rearwardly, the ejection shaft 36 is also moved rearwardly, with the boss 39 supported and sliding axially in the collar 22. The ejection shaft 36 is, in addition, supported by a plurality of guide posts 47 spaced along its length.

The shaft 36 and the probe 12 are urged forwardly of the housing 11 by means of a tension spring 48 extending rearwardly from a fixed post 49 rigidly attached to the housing 11 to a projecting post 51 integral with the shaft 36. The spring 48, therefore, acts to position the shaft 36 so that the microswitch 31 is cammed onto the "off" position when no probe cover 28 is installed, and, when a probe cover is installed on the probe, to urge the probe 12 into good, heat conducting contact with the installed probe cover. The biasing forces of the spring 48 are not so strong, however, as to overcome the frictional retention forces exerted by the resilient split ring 25 on the probe cover 28.

In use, the thermometer 10 is fitted with a probe cover 28 by inserting the probe 12 into one of a plurality of such covers, typically supplied in a hygienically packaged box 53. (See FIG. 5). When the probe 12 is fully inserted into a probe cover 28, further forward movement of the thermometer housing 11 moves the probe and ejection shaft 36 rearwardly with respect to the housing until the shoulder 29 in the probe cover abuts the sleeve 22c, and the retaining ring 25 secures the cover in the installed position as shown in FIG. 2. and FIG. 4. This rearward movement also cams the microswitch actuator 32 on the "on" position, and the thermometer is ready for use.

After use, the ejection button 38 is pressed, and the probe 12 is moved forwardly with respect to the housing 11, to force the probe cover 28 free of its retaining means, allowing it to fall into a waste container. (See FIG. 6). This ejection action cams the microswitch actuator 32 back to the "off" position, thus significantly reducing wasteful power consumption and resulting in more efficient utilization of the thermometer 10.

In the embodiment illustrated, the housing 11 may be conveniently formed of two identical halves of molded plastic material secured together by a plurality of lugs 53 at the rearward end 11b and a securing ring 54 encircling the housing near the front end 11a and fitted in a circumferential groove 55. While overall thermometer housing shape is not critical, the housing 11, in a presently preferred embodiment, is substantially rectangular in cross-section except for its front end 11a, where a transition occurs to a substantially conical shape defining the inner cavity 21. The rearward end 11b is tapered and includes a sloping window 56 through which the display device 17 may be viewed.

It will be appreciated from the foregoing that practice of the present invention significantly improves the efficiency of utilization of portable electronic thermometers. Since electrical power is supplied to the thermometer using this invention only when a probe cover is presently installed for use, considerable power savings result and the thermometer will be available for use for a greater proportion of time.

Although a specific embodiment of the invention has been illustrated and described herein in detail, it will be appreciated from the foregoing that various modifications may be made without departing from the spirit and scope of the invention. Accordingly, it is not intended that the invention be limited, except as by the appended claims.

I claim:

1. For use with an electronic thermometer employing a temperature sensing probe and removable probe cover, automatic actuation and deactuation means, comprising in combination:

a switch for switching the thermometer on and off; and means responsive to installation of a probe cover on the temperature sensing probe, for placing said switch in an "on" condition, said means also being responsive to ejection of the probe cover for returning said switch to an off" condition.

2. A combination as set forth in claim 1, wherein said means includes a cam for selectively engaging said switch.

3. A combination as set forth in claim 1, wherein: said switch includes an actuator arm; and said means for placing said switch in an "on" condition includes a cam coupled to the temperature sensing probe and positioned to cam said actuator arm to the "on" condition on a rearward movement of said cam, whereby installation of a probe cover is effected by moving the probe and probe cover rearwardly until the probe cover reaches an installed position.

4. A combination as set forth in claim 3, wherein:
said cam includes a camming surface on a shaft attached to the probe and extending rearwardly therefrom.

5. For use with an electronic thermometer employing a temperature sensing probe and removable probe cover, automatic actuation and deactuation means, comprising in combination:
a switch for switching the thermometer on and off, said switch having an actuator arm movable between an "on" condition and an "off" condition, said actuator arm being normally biased toward the "off" condition; and
means responsive to installation of a probe cover on the temperature sensing probe, for moving said switch actuator arm to the "on" condition, said means including a shaft attached to the probe and extending rearwardly therefrom, said shaft having a camming surface positioned to cam said actuator arm to the "on" position on a rearward movement of the probe;
said shaft also being manually movable in a forward direction to eject the cover from the thermometer and to allow said biased actuator arm to return to the "off" condition.

6. In an electronic thermometer enclosed in a single housing and having an integrally mounted temperature sensing probe, a removable probe cover, and probe cover retaining means, the improvement comprising:
a cam-operated switch connected between the thermometer and its power source;
camming means connected to the probe for camming said switch to an "on" position automatically as the probe is moved inwardly with respect to the housing to permit engagement of the probe cover with its retaining means;
manually operable probe cover ejection means, connected with said camming means and said probe, for ejecting the probe cover from the probe by applying an outward force on the probe to free the probe cover from its retaining means, and for simultaneously moving said camming means to automatically cam said switch to an "off" position.

7. The improvement set forth in claim 6, and further including:
resilient means for urging said camming means and the probe outwardly, thereby to maintain said switch in the "off" position if no probe cover is installed and to urge the probe against the probe cover when a cover is installed.

8. The improvement set forth in claim 6, wherein:
said manually operable probe cover ejection means include an ejector button extending from the thermometer housing.

9. In an electronic thermometer enclosed in a single housing and having an integrally mounted temperature sensing probe, a disposable probe cover, a self-contained power source, and probe cover retaining means, the improvement comprising:
a cam-operated switch connected to control electrical current flow from the power source;
a switch actuator attached to the probe and having an integral camming surface arranged to cam said switch between an "off" position and an "on" position as said switch actuator is moved with said probe between an extended position and a retracted position; and
a manually operable ejection control mechanically linked with said switch actuator so that operation of said control results in movement of said switch actuator and the probe to the extended position, thereby camming said switch to the "off" position and ejecting the probe cover from its retaining means.

10. The improvement set forth in claim 9, wherein said manually operated ejection control is a button on the housing rigidly connected with said switch actuator to form an integral shaft extending through the housing.

11. The improvement set forth in claim 10, further including resilient means for urging said shaft and the attached probe toward its extended position.

12. In a probe unit for an electronic thermometer, the probe unit having a temperature sensing probe, a replaceable probe cover, and probe cover retaining means, the improvement comprising:
a cam-operated switch housed in the probe unit and electrically connected with the thermometer for switching it on and off;
camming means rigidly connected with the probe for camming said switch to an "on" position as the probe is moved inwardly with respect to the probe unit to allow engagement of the probe cover with its retaining means; and
probe cover ejection means manually operable to move the probe, camming means, and probe cover outwardly with respect to the probe unit, and thereby to eject the probe cover and, in substantially the same action, cam said switch to an "off" position.

* * * * *